Sept. 2, 1941.  J. A. MOONEY  2,254,305
CORNCOB HOLDER
Filed June 10, 1940
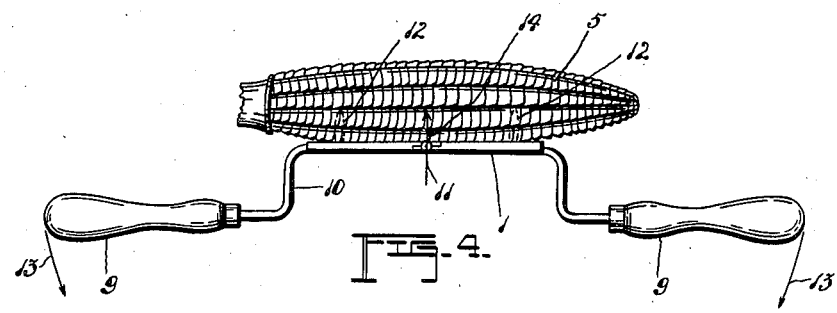
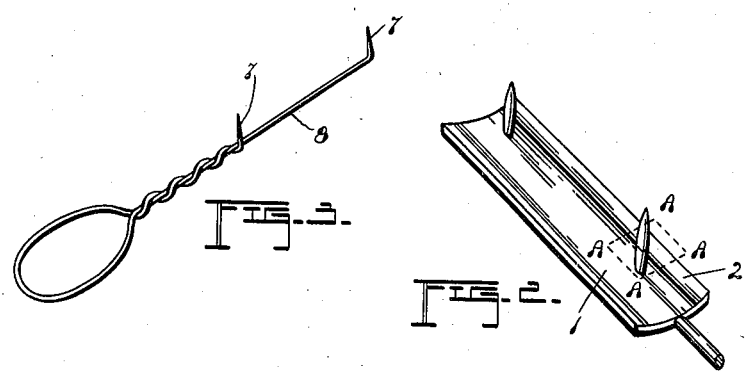
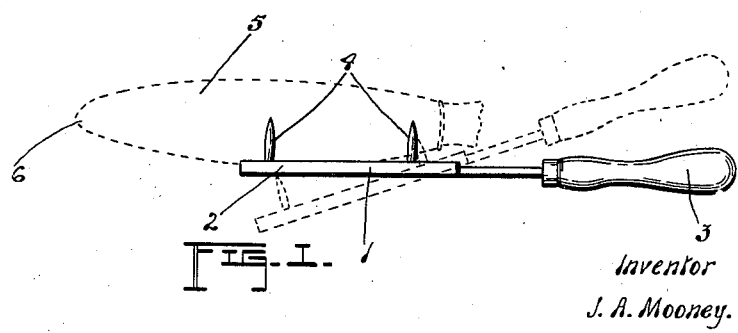
Inventor
J. A. Mooney.
Fetherstonhaugh & Co.
Atty's.

Patented Sept. 2, 1941

2,254,305

UNITED STATES PATENT OFFICE 2,254,305

CORNCOB HOLDER

John A. Mooney, Regina, Saskatchewan, Canada

Application June 10, 1940, Serial No. 339,819

8 Claims. (Cl. 294—5)

My invention relates to corn-cob holders, an object of the invention being to provide a device of the character herewithin described by means of which cobs of corn may be more conveniently handled while being eaten and which will avoid the present necessity for soiling the hands through grasping the cob at both ends.

A further object of my invention is to provide a device of the character herewithin described which is easy to manipulate, of simplified construction, and economical to manufacture.

A further object of my invention is to provide a device of the character herewithin described which is susceptible to being ornamented attractively according to the price-range in which it is sold and also capable of being manufactured with extreme economy as a low-priced utensil for sale through five and ten cent stores and the like.

A further object of my invention is to provide a device of the character herewithin described from which a cob of corn may easily be detached when the kernels thereof have all been eaten or when it is necessary to turn it around prior to nibbling off the kernels from another part of its surface.

With the above more important objects in view and such other minor objects as may appear as the specification proceeds, my invention consists essentially in the arrangement and construction of parts all as hereinafter more particularly described, reference being had to the accompanying drawing, in which—

Figure 1 is a side elevation of my corn-cob holder also illustrating in dotted lines the manner in which and the ease with which, a cob of corn may be detached.

Figure 2 is a perspective detail illustrating the curved cross-sectional contour of the support forming part of my corn-cob holder.

Figure 3 is a perspective illustration of my corn-cob holder manufactured from a single piece of wire for sale as a low-priced utensil.

Figure 4 is a side elevation of an alternative embodiment of my corn-cob holder.

In the drawing like characters of reference indicate corresponding parts in the different figures.

Describing first the embodiment of my invention illustrated in the accompanying Figures 1 and 2, it will be seen that the same comprises a support 1 in the form of a longitudinally extending plate 2, the support projecting from a handle 3 and being provided thereupon with spaced prongs 4 which project upwardly from the support.

It will be seen that these prongs are spaced apart and are situated adjacent either end of the plate and by reference to the accompanying Figure 2 it will also be seen that the prongs are ground to an oval cross-sectional configuration on plane A—A—A—A, so that the prongs will more easily penetrate the woody fibre of the core, the grain of which of course extends longitudinally.

It will be seen that the two prongs are positioned centrally upon the plate and in longitudinal alignment. It is also to be understood that although I have illustrated my corn-cob support in the accompanying Figure 2 as having an arcuate cross-sectional configuration, the same may if desired, be flat. By reference to the accompanying Figure 1, the phantom lines clearly illustrate the means by which a corn-cob 5 may be released from my utensil by a levering action, wherein the tip 6 of the corn-cob will be pressed against the plate, after which it may be rolled around or discarded.

In the accompanying Figure 3 I have shown an extremely simplified embodiment of my holder as manufactured from a single length of round wire, each end of which will be pointed to provide the prongs 7, while the portion 8 will function as the support. Such a modification as this could economically be manufactured for sale through five and ten cent stores and the like, and through chain stores.

In the accompanying Figure 4 I have shown an alternative embodiment of my invention, wherein the support 1 is positioned between a pair of handles 9 arranged in off-set relationship to the support by means of the angulated portions 10. In this embodiment the support is hinged at the center 11, there being one or more prongs 12 at the ends of the hinged support.

This embodiment permits of removal of the corn-cob 5 by breaking the joint formed by my hinge through moving the handles 9 downwardly in the direction of the arrows 13, which obviously exerts an upward force adjacent the point 11 as clearly illustrated by the arrow 14, whereby the prongs 12 are positively withdrawn from the corn-cob.

Since various modifications can be made in my invention as hereinabove described and as illustrated in the accompanying drawing, and many apparently widely different embodiments of same made within the scope of the claims without departing from such spirit and scope, it is intended that all matter contained in the accompanying specification and drawing shall be interpreted as illustrative only and not in a limiting sense and I desire only such limitations placed thereon as are specifically expressed in the accompanying claims.

What I claim as my invention is:

1. A corn-cob holder comprising in combination a handle, a corn-cob support projecting from said handle and outwardly projecting prongs secured to said support, said prongs being designed to penetrate the flank of a corn-cob.

2. A corn-cob holder comprising in combination a handle, a corn-cob support projecting therefrom and at least two spaced prongs upon said support projecting outwardly therefrom, said prongs being designed to penetrate the flank of a corn-cob.

3. A corn-cob holder comprising in combination a handle, a corn-cob support projecting from said handle in the form of a longitudinally extending plate and at least two spaced prongs attached to said plate and projecting outwardly therefrom.

4. A corn-cob holder comprising in combination a handle, a projecting corn-cob support in the form of a narrow, elongated plate positioned in the plane of said handle and at least two outwardly projecting prongs attached to said plate adjacent either end thereof.

5. The device as defined in claim 4 in which said plate is of arcuate cross-sectional configuration.

6. A corn-cob holder comprising in combination, a corn-cob support having at least two outwardly projecting, spaced prongs thereon and a pair of handles secured to said support at either end thereof.

7. A corn-cob holder comprising in combination, a handle, a corn-cob support projecting from said handle, and parallel, outwardly projecting prongs secured to said support.

8. A wire corn-cob holder comprising a wire shank, a handle at the end thereof, said shank being angulated at the end thereof to form a prong, at least one additional prong positioned medially of the length of said shank, said prongs being parallel and projecting outwardly from said shank.

JOHN A. MOONEY.